United States Patent [19]

McWherter

[11] Patent Number: 5,113,340

[45] Date of Patent: May 12, 1992

[54] SEARCH IMPROVEMENTS FOR ELECTRONIC SPELLING MACHINE

[75] Inventor: David McWherter, Bensalem, Pa.

[73] Assignee: Franklin Electronic Publishers, Incorporated, Mt. Holly, N.J.

[21] Appl. No.: 199,060

[22] Filed: May 25, 1988

[51] Int. Cl.⁵ .................................. G06F 15/40
[52] U.S. Cl. ................................ 364/419; 364/900
[58] Field of Search .............. 364/419, 200, 900

[56] References Cited

U.S. PATENT DOCUMENTS

| | | | |
|---|---|---|---|
| 4,490,811 | 12/1984 | Yianilos et al. | 364/900 |
| 4,758,955 | 7/1988 | Chen | 364/419 |
| 4,782,464 | 11/1988 | Gray et al. | 364/900 |
| 4,830,618 | 5/1989 | David | 434/169 |

Primary Examiner—Clark A. Jablon

Attorney, Agent, or Firm—McAulay Fisher Nissen Goldberg & Kiel

[57] ABSTRACT

Improvements in a hand-held spelling machine increase the speed with which a query word is compared against the words in memory. One technique is to provide a look up table to encode all character sets of one or two letters into a coded string. Where the set of letters is three or more characters, a previously known algorithm is employed. Search of the memory is limited to only a few main branches of the tree. The limitation is a function of the first query word letter. The time it takes to calculate the similarity function is saved in two circumstances. When a similarity function is calculated at a particular level of the tree and found to be great enough so that there is no prune of the tree, then that decision not to prune is carried forward for other tree branches having the same letters prior to the level involved.

9 Claims, 4 Drawing Sheets

Microfiche Appendix Included
(5 Microfiche, 320 Pages)

SEARCH IMPROVEMENTS FOR ELECTRONIC SPELLING MACHINE

A Microfiche Appendix consisting of five sheets having 320 frames plus five test frames is included.

BACKGROUND OF THE INVENTION

This invention relates in general to an improved electronic spelling machine and in particular to one having an enhanced ability to compare an input or query word against the set of words stored in the dictionary.

The utility of hand-held electronic spelling machines is essentially in their ability to provide an appropriate list of suggested matches against a query word and to do so in a minimum of time. This utility requires that the dictionary words selected for presentation to the user as a possible match against a query word be reasonably extensive, so that most likely correspondences will be presented to the user, and yet not so extensive as to overwhelm the user or make it unrealistic for the user to select the appropriate matching word.

It is also important to the utility of such a machine that the search procedure by which the query word is scanned through the dictionary be minimized to provide the user with a response that is as rapid as possible. The response time should be substantially less than the time that would be taken by the user to leaf through a dictionary in search of various possible matching words.

Accordingly, the major purpose of this invention is to increase the speed with which a query word is compared against the words in memory without excessively limiting the number of possible candidates provided to the user.

Applicant refers to U.S. Pat. No. 4,490,811 dated Dec. 25, 1984 entitled String Comparator Device System Circuit And Method and incorporates the disclosure of that patent herein. That patent discloses a string comparator technique of the sort with which the improvements of this invention operate. Accordingly, applicant will not disclose herein the particular string comparator techniques because such are disclosed in said '811 patent. In particular, applicant's references herein to word similarity characteristic is to the string comparison function disclosed in the '811 patent. For convenience, this function is called the theta function herein.

What applicant has done in connection with the embodiment of the invention described herein is to provide an enhanced technique for encoding strings of the type referred to in the '811 patent. Applicant has also provided an improved technique for limiting those portions of the dictionary in memory that are to be compared against a query word. This speeds up the process of traversing the memory which is in tree format. Applicant has also provided certain techniques for speeding up the decision making on whether or not to prune certain branches of the tree.

BRIEF DESCRIPTION

In brief, this invention provides various techniques for increasing the speed of the matching or comparison process without losing comprehensiveness. The features of this increased speed of process can best be understood in the context of the tree arrangement by which the words of the dictionary are stored in memory.

One important technique is to provide a look-up table to encode all character sets of one or two characters into a coded string. Essentially, whenever a segment of a branch of the tree has either one character or two characters, the coded string is provided from a look-up table rather than from an algorithm. When the branch segment has three characters, that set of characters is provided as a coded string by means of an algorithm. The use of a look-up table enormously speeds up the operation. By limiting the look-up table to character sets of one or two characters, the memory that has to be set aside for the look-up table is minimized and kept commensurate with requirements of a hand-held portable, usable dictionary.

In addition, a significant restriction on the portion of memory which is compared against a query word is introduced by virtue of limiting those branches of the tree memory which are traversed. Based on the first letter of the query word, only those words are traversed whose first letter is one of a relatively few letters. The particular first word letters to which a tree traverse is limited is a function of the particular first letter of the query word. All other branches of the memory are pruned. For vowels, six first letter branches are traversed, namely words starting with A, E, I, O and U. For the consonants B and D only the branch having the first level characters B and D, respectively, are traversed.

Furthermore, it has been found that certain of the similarity characteristic (theta) calculations can be omitted thereby speeding up the entire processing operation. The occasion for the omissions of the theta calculation can best be understood in the detailed description. Suffice it to say here that the reason for making a theta calculation is to provide a criteria by which branches of the memory tree can be pruned or skipped. However, the theta calculation involves a division operation between characteristics of two strings and that division operation takes time. What has been observed is that there are certain situations where the likelihood of meaningful pruning is low. Thus, on the average, the time saved by omitting the theta calculation is greater than the additional tree traversal time occasioned by ignoring theta.

DESCRIPTION OF THE PREFERRED EMBODIMENTS

Figure 1:
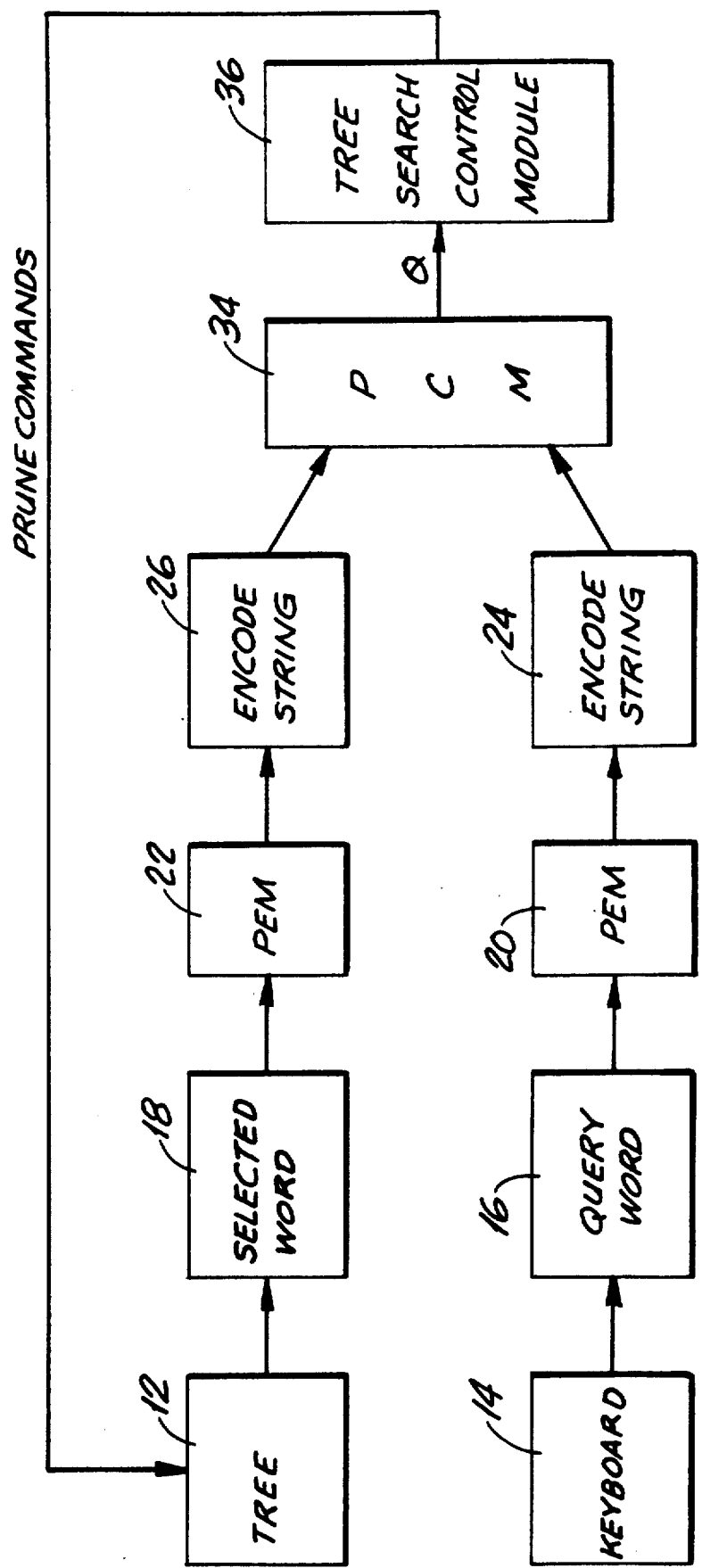
FIG. 1 is a block diagram illustration of the operation of the device of this invention and of the relationships between various sequences of functions performed.

FIG. 1 is a block diagram illustrating the relationship between the main elements of the system of this invention. The tree 12 represents storage in memory, in a tree format, of the word list. In one embodiment the word list is somewhat over 80,000 words. The keyboard 14 is a means by which the user selects a query word 16. The query word 16 is compared by this system against each word that is selected from the tree 12. The selected words 18 are selected in sequence in accordance with the program of this system.

Each query word 16 and each selected word 18 are applied to a Phonetic Encode Module, the PEM 20 and PEM 22, respectively. For each word applied to a PEM 20, 22, an encode string 24, 26 is developed by the PEM. The encode string includes the ASCII letters of the word as well as a transition code, a group code and is a superset of the essence string. The essence string contains the essence of the string's phonetic qualities which essentially are the phonetic consonant group codes as explained more fully further on. For purposes of present understanding, it might help to note that vowel sounds are omitted from the essence string and consonant sounds are grouped into seven groupings. The essence string is a subset of the full encoding represented by the encode string.

A Phonetic Comparison Module, PCM 34 provides a comparison of the encode string 24 for the query word 16 and the encode string 26 for the particular word 18 provided from the tree 12. The PCM 34 output is the theta value representing a similarity ratio between the two strings as described in said '811 patent.

Theta is a ratio characteristic that indicates the similarity of two words being compared and, more particularly, the similarity of two indicia strings being compared. The indicia strings being compared are the encode string 24 representing the query word and the encode string 26 representing the selected word 18 from the tree memory 12.

The theta value is applied to a tree search control module, TSCM 36 which compares theta against a threshold. If theta is below the threshold, then the two strings (and the words they represent) are dissimilar enough to command no further traverse along that branch of the tree. Thus the TSCM 36 effects an appropriate prune of the tree 12. This pruning technique means that branches of the tree 12 can be eliminated from the comparison against the particular query word 16 thereby eliminating a portion of the word list in the tree 12 from the selected word 18 category.

The prune commands provided by the TSCM 23 are determined in a fashion that provides an optimum trade-off between the conflicting requirements of pruning as many words as possible to make the search time reasonable, while at the same time avoiding the pruning of branches which contain words that may be matches to the query word 16. The threshold selected is determined by experimentally exercising the device at various thresholds to obtain a satisfactory tradeoff.

THE TREE

Figure 2:
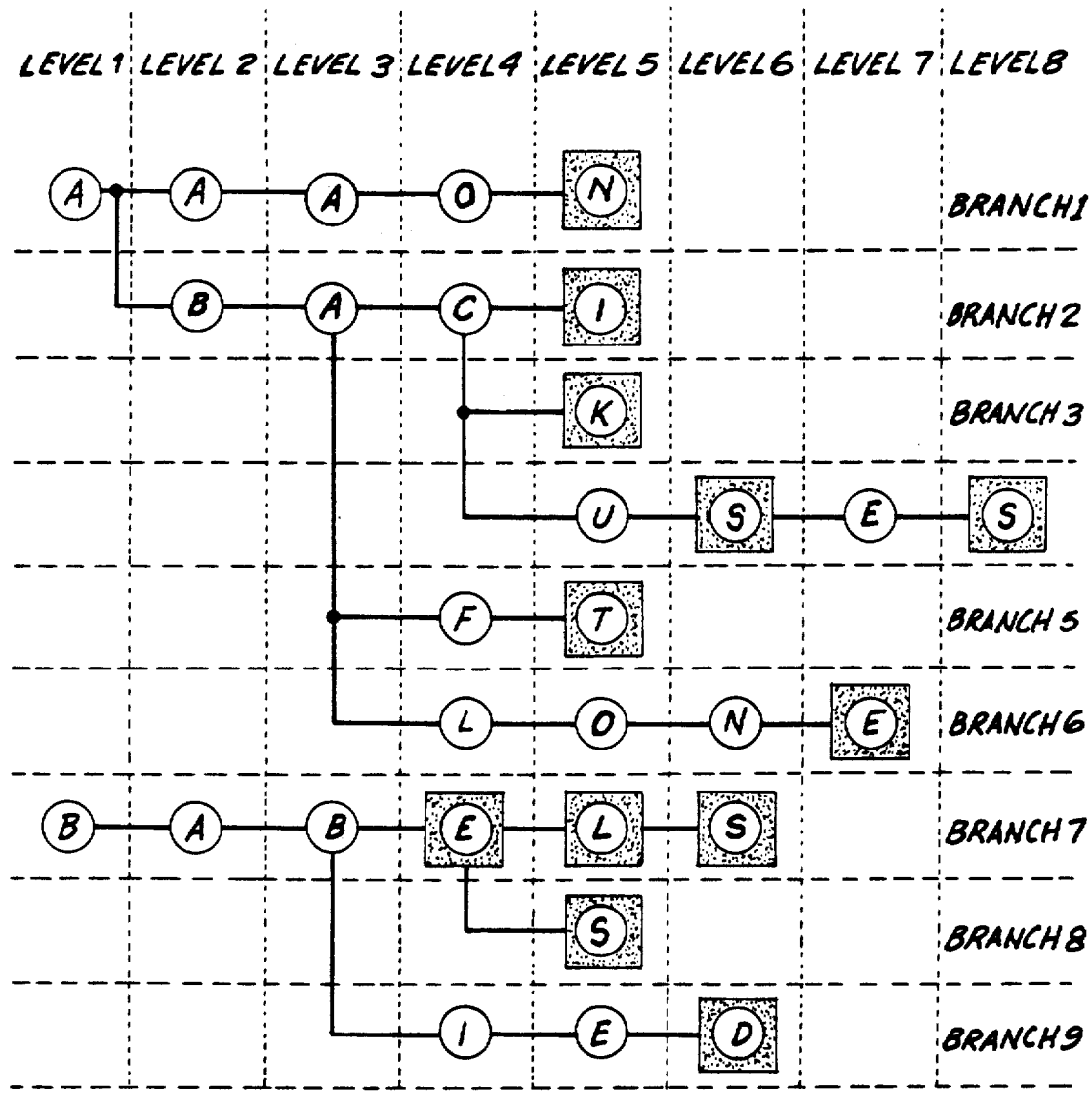
FIG. 2 is a simple schematic illustration of a tiny segment of the word list in tree format.

FIG. 2 exemplifies a word list tree layout. This arrangement is often called a TRIE in the art. It represents only the tiniest fraction of the tree layout. It is arranged in terms of branches and levels. Each intersection of a branch and a level is a node. Level 1 carries the initial letter of a word and thus nominally only 26 of the nodes at level 1 would have a character entry, representing the 26 letters of the alphabet. Level 2 represents the second letter of a word and thus for any one entry at level 1, there could be up to 26 entries at level 2 although in reality there would be substantially fewer than 26.

Each letter which is part of two or more words is connected to multiple branches, all of which thus stem from that particular node. An end of word letter is flagged as such and that flag is represented in FIG. 2 by the symbol designated therein. It should be noted that within each branch more than one word can terminate. For example in branch 7 there are the words BABE, BABEL, and BABELS.

As used herein, the term branch segment will refer to the set of continuous letters in a branch which end with an end of valid word letter and which contain only one end of valid word letter. Thus in branch 4, US is one branch segment and ES is another branch segment while in branch 7 BABE is one branch segment, L is a second branch segment and S is a third branch segment.

THE ENCODE STRING

The phonetic encoding module PEM 20, 22 provides an output 24, 26 that consists of three things. They are the original ASCII characters of the word, certain major phonetic components of the word and encoding status information which gives information concerning the current status of the encoding process including information such as: are we at the start or end of a word?, how long is each of the encoded strings so far? and are we in the middle of a special character sequence?.

The status information and the ASCII characters are types of information that are known to provide in this art. The phonetic components of the word are an essence string which is a subset of the encode string.

The consonant characters in the words 16, 18 and PEM 20, 22 are placed into one of a seven major component groups. These seven consonant groups are set forth in the Table below. All vowels are placed in Group 8 and all vowels sounds are treated as being identical for the purposes of providing a comparison between a query word and a selected word. In part, because all vowels are treated as being identical, the essence string component of the encode string contains no vowel sound indicators. The letter H is not included in any Group.

| Group | Letters |
|---|---|
| 1 | G, T, C, D, J, K, Q, and X |
| 2 | B and P |
| 3 | S and Z |
| 4 | F and V |
| 5 | M and N |
| 6 | W, R, and a leading L |
| 7 | L |
| 8 | All vowels: A, E, I, O, U, and Y |

A leading L is simply an L as the first letter of the word.

An example of an encode string is set forth below. All of the vowel sounds are treated as identical. Using as an example, PHONETIC as the input word (be it a query word or selected word), the encode string would contain the following:

| | |
|---|---|
| P | the ASCII character |
| TC code 224 | transition code, from no sound to P sound |
| Group 4 code | F sound |
| H | the silent ASCII H character |
| O | the ASCII character |
| Group 8 code | vowel sound |
| N | the ASCII character |
| TC code 236 | transition code, from P sound to N sound |
| Group 5 code | N sound |
| E | the ASCII character |
| Group 8 code | vowel sound |
| T | the ASCII character |
| TC code 205 | transition code, from N |

| | sound to T sound |
|---|---|
| Group 1 code | T sound |
| 1 | the ASCII character |
| Group 8 code | vowel sound |
| C | the ASCII character |
| — | no transition code, since T and C are in same group |
| Group 1 code | C sound |

The phonetic comparison module 34 compares the phonetically encoded query word 16 with the phonetically encoded selection word 18 to provide a similarity characteristic theta. This similarity characteristic is the theta calculation disclosed in the referenced '811 patent and thus no detailed disclosure of such is required herein Suffice it to say that a two pass algorithm is employed in calculating theta. A first pass is a comparison of the characters in a forward direction and the second pass is a comparison of the characters in a backward direction.

LOOK UP TABLE

The phonetic encode module PEM 22 combines a look up table and an algorithm for providing the encode string 26. The look up table is employed when the branch segment being encoded is one or two letters. The algorithm is employed where the branch segment is three or more letters. This provides an optimum trade-off of software capacity and encoding speed. Capacity is limited in a hand-held device and encoding speed is important for the utility of a hand-held device. It should be recognized that the significant value of the look up table in the PEM 22 is that when the tree is traversed, branch segments are often added to words or branch segments that have already been encoded. For example, with reference to FIG. 2, if ABACUS has been encoded, that encoding would have been by the algorithm. But the encoding of ABACUSES would constitute adding the encoding of ES to what has already been encoded. The encoding of ES would be done through the look up table. Branch 7 shows another situation where the first word encoded BABE would be by the algorithm but the additional encoding necessary to provide the word BABEL would be by the look up table.

FIRST CHARACTER PRUNE

The table below labelled First Character Prune indicates the specific operation of this first character pruning technique. The first letter of the query word is identified. The word is then compared only with the words in the tree that begin with one of the letters indicated in the second column of the table. All the branches of the tree that start with all other letters are pruned and thus the search time is materially reduced. For example, the query word "GRAET" would be compared only against words in the dictionary which start with one of the four letters G, J, N or K. It will also be noted from the table that the vowels A, E, I, O and U are compared only against all of the words starting with a vowel including the vowel Y. The vowel Y is also compared against all words starting with a vowel and in addition is also compared against words starting with J.

Other pruning techniques may result in further pruning of the traverse. However, the prune based on the first character is the significant prune added by the improvement of this invention in saving time.

| First Character Based Prune | |
|---|---|
| First Letter of Query Word | Can Be Matched With Words Having The Following First Letters |
| A | A E I O U Y |
| B | B |
| C | C K S Q |
| D | D |
| E | A E I O U Y |
| F | F P V |
| G | G J N K |
| H | H W |
| I | A E I O U Y |
| J | J G H Y |
| K | K C Q N G |
| L | L R |
| M | M N |
| N | M N P G K |
| O | A E I O U Y |
| P | P F T N S |
| Q | Q C K |
| R | R L W |
| S | S C Z P |
| T | T P |
| U | A E I O U Y |
| V | V F |
| W | W H R |
| X | X Z S |
| Y | A E I O U Y J |
| Z | Z S X |

The N Level Processing Simplification

The tree branch pruning that is normally undertaken is a function of the theta value calculations of the sort disclosed in the '811 patent. What has been found is that there are two circumstances in which by foregoing pruning, time can be saved on the theta calculation that on the average more than makes up for the additional time involved in going through the branches of the tree that were not pruned. The pruning of the search routine normally saves time. But there are particular circumstances where the amount of time saved by pruning (and thus avoiding traversing a portion of the tree) does not warrant the time it takes to make the calculation that supports the prune.

A first one of these situations is where a theta calculation determines that one does not prune at a particular tree level. That determination not to prune is carried down at that tree level without requiring that the theta calculation be remade for letter changes at that level. This can best be understood with reference to a particular example.

The theta calculation is not made at levels 1, 2 or 3 because the dissimilarity factor is inadequate to justify the pruning of branches. The theta calculation is made at level 4 and above. When the theta calculation is less than a particular threshold, then all of the branches which stem from that level 4 character are pruned and no further comparison is made of the query word against words in those branches. But if theta is greater than the threshold, the indication of similarity is sufficiently great so that no pruning is involved.

What has been recognized in this invention is that the calculation of theta being greater than such a threshold at level 4 can be used to make the non-pruning decision at level 4 for all tree words having the same letters at the first three levels.

For example, with reference to FIG. 1, if ABAC from the tree is compared with the query word and the theta calculation is greater than the threshold, then a decision is made to proceed to level 5 and come up with words such as ABACI, ABACK, ABACUS and ABACUSES. Now, rather than recalculate theta for ABAF, the determination that pruning would not be undertaken for branches stemming from ABAC is automatically applied to branches stemming from ABAF as well as branches stemming from ABAL. This means that two theta calculations are avoided and that the time consumed in those two theta calculations is saved. Experience shows that traversing those branches for comparison against the query word has sufficient likelihood of providing valid words so that there is a reasonable trade off of time saved in calculating theta against time that might be saved in pruning these branches.

This particular theta calculation saving routine does not affect the calculation of theta at level 5. Such calculations proceed regardless of the decision at level 4. Furthermore, theta calculations are made at level 4 where the first 32 letters are not identical. Thus, a theta calculation for the branch segment ABAC which results in the decision not to prune is a decision that would not be applied in branch 1 because the first three letters AAR differ from the first three letters ABA.

LARGE QUERY WORD PROCESSING SIMPLIFICATION

On a query word with seven or more characters, the division operation employed to provide the theta value becomes cumbersome. As described in the '811 patent, there are actually two comparison passes made, the first one of which informs the second one and both of which provide theta values that can be evaluated against different thresholds. The normal theta calculation and evaluation scheme is simplified and thus time is saved in this invention by eliminating one of two division operations.

As disclosed in the '811 patent, the theta calculation or similarity function is calculated as a forward similarity function between the query word and each stored data word and is also separately calculated as a reverse similarity function between the query word and each stored data word. This dual similarity function calculation is the preferred mode for determining the degree of similarity and determining whether or not pruning is called for.

What has been determined in connection with the improvements of this invention is that the calculation of theta after the forward comparison can be eliminated for words having seven or more characters. Pruning decisions on such words are made after the final theta calculation is provided subsequent to the completion of both the forward and reverse comparisons. Avoiding the calculation of the theta value after the forward comparison saves more time than the increased tree traversal time that may be incurred by virtue of not pruning in response to the first theta calculation.

Figure 3:
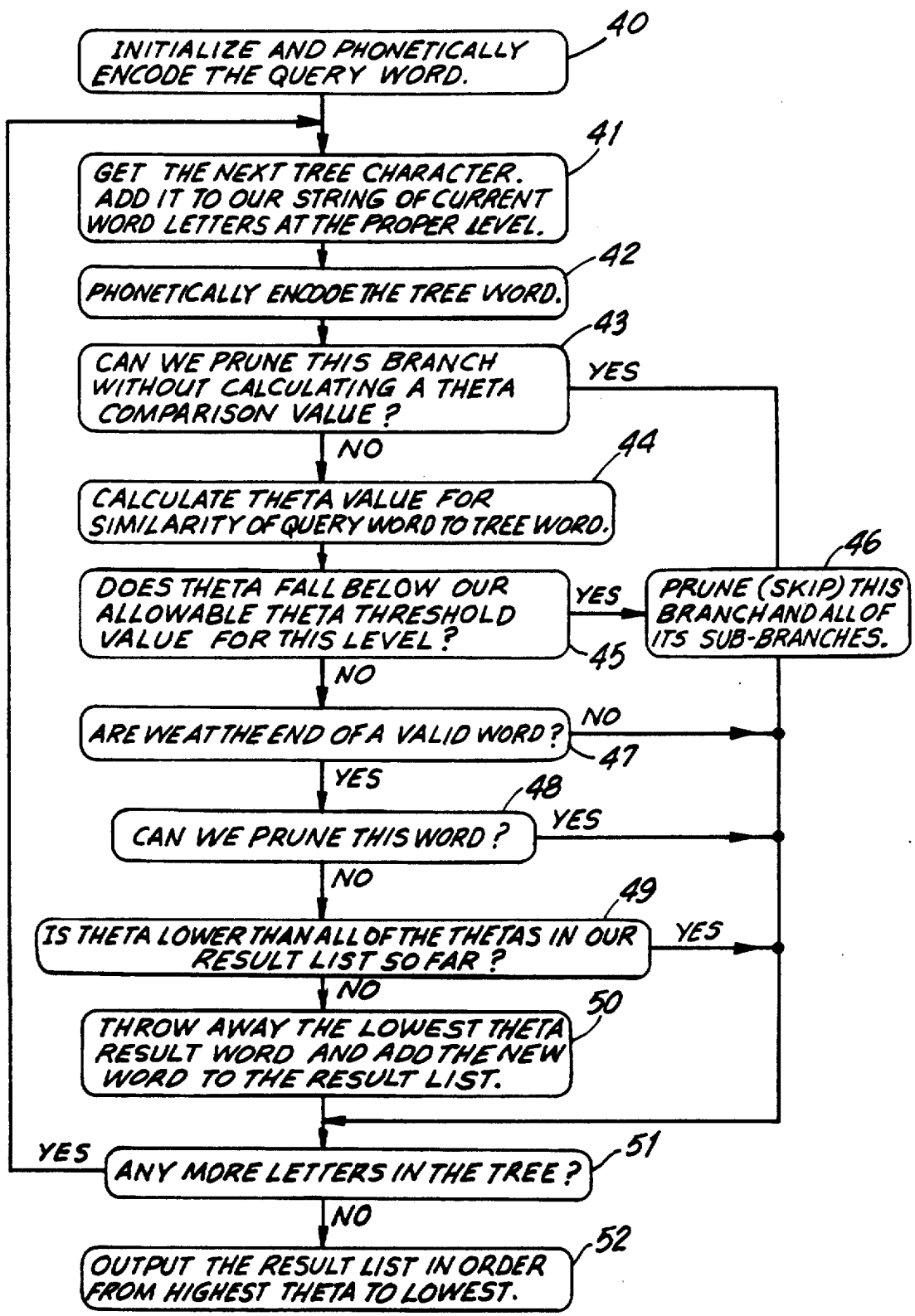
FIG. 3 is a flow chart of the main functions of the device of this invention.

FIG. 3 is a flow chart representing a significant portion of the phonetic correction routine. The process indicated at the function box 40 refers to the encoding function which provides the query word encode string 24. Function box 41 refers to the next step in the traverse of the tree so as to provide the next string of word letters. The function box 42 refers to providing the encode string 26 for the set of current word letters provided by the function box 41. The function box 43 is the first character prune. The function box 44 refers to the theta value calculations of the sort described in the reference to the '811 patent.

The decision box 45 provides a prune command as indicated at function box 46 if the theta value is below a particular threshold. However, if the theta value is above a particular threshold then a pruning command is not generated. It might be noted that the threshold has to be determined experimentally for each level of the tree. Different threshold values have to be established and, for any given memory entry format, the device has to be exercised and the tree traversed for a large number of query words in order to determine the optimum threshold value so that a minimum number of desirable words are eliminated yet a reasonable amount of pruning occurs so that the traversal time is reduced.

The decision boxes 47 and 48 are pretty much self evident and provide the technique for eliminating certain valid words based on the theta value being below a threshold.

The decision box 49 provides the determination for ranking the words in the result list provided by the function box 50. The decision box 51 simply provides an indication that the tree has been completely traversed so that the result list can be put out in the ranking established by the function box 50. This output is indicated by the function box 52 and may be provided to a screen on the keyboard of the machine dictionary.

Figure 4:
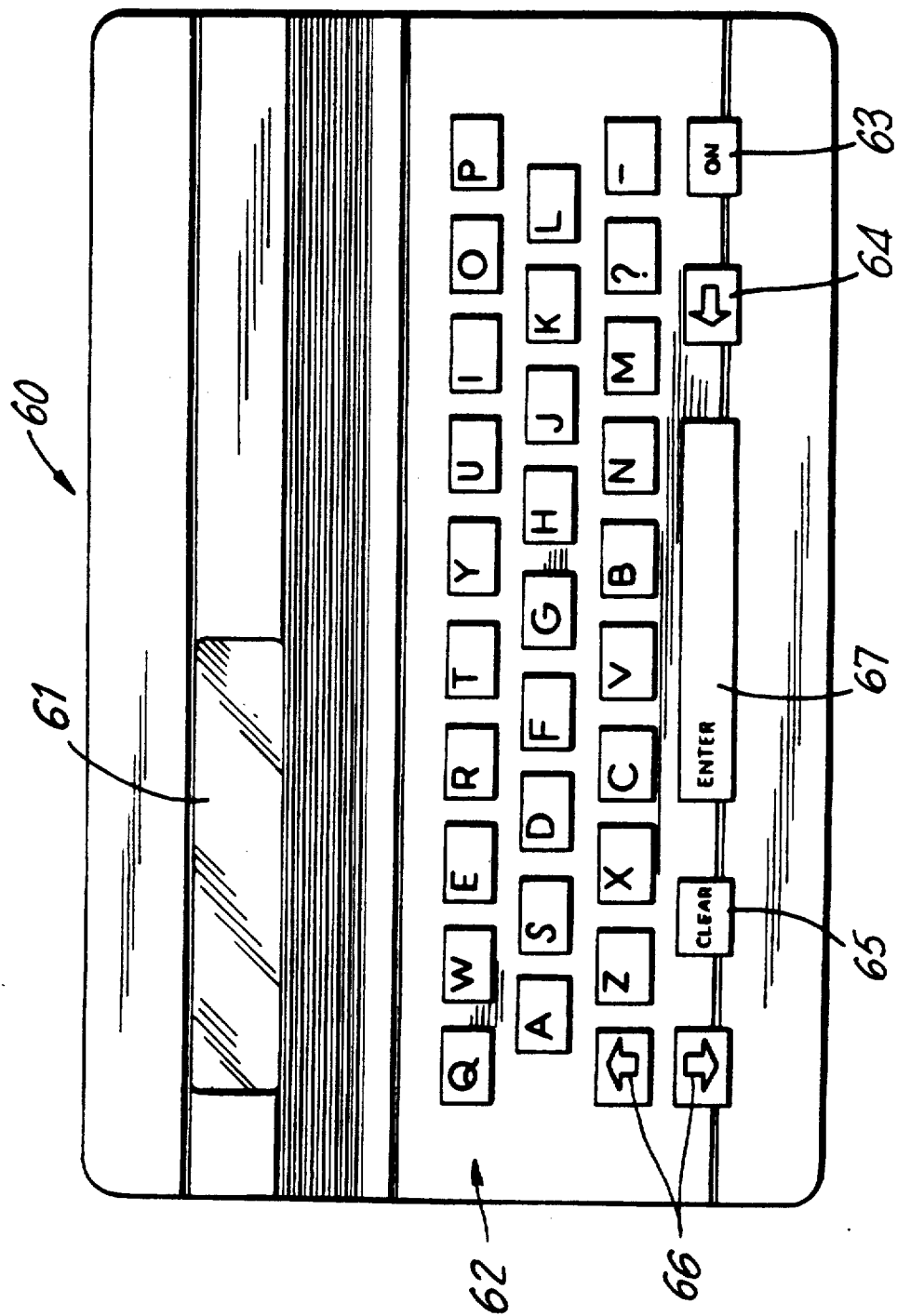
FIG. 4 is a plan view of a device incorporating the improvements of this invention.

The device 60 shown in FIG. 4 illustrates a self-contained, battery operated, readily portable, hand-holdable product having a one line LCD character display 61 and a keyboard 62. The keyboard 62 includes keys for the 26 letters of the alphabet. In addition, it has an on switch 63 and a backspace key 64. The clear key 65 clears the display and permits the user to initiate another query word. The two keys 66 are scroll keys permitting the user to scroll back and forth through the word list that has been developed by the process illustrated in FIG. 3 in response to a query word. The enter key 67 is actuated after a query word has been completed so that the device will perform the tree traverse functions described herein.

Microfiche attached Appendix A is a presently preferred listing in Z80 assembly source code together with commentary in Source Code C. This listing is by way of an example of the routines for accessing and operating an electronic dictionary to implement the combinations of routines of this invention. A skilled programmer may implement the invention by means of a different code listing.

With respect to the file listing Appendix A, the 26 page file labelled with the file name: Zcorrect is of particular pertinence to the subject matter of this invention. Roughly speaking, material on pages 4 and 5 of that listing are relevant to the first character prune, the material on pages 5 and 6 are relevant to the N level processing simplification. The material on pages 7 and 8 are relevant to the large query word processing simplification.

The contents of the Microfiche Appendix in sequence are as follows:

| File Name | Frame Nos. | Starts on Microfiche Sheet Number |
|---|---|---|
| SpHl.asm | 003-030 | 1 |
| CUtils.asm | 031-036 | 1 |
| Io.asm | 037-069 | 1 |
| HelpText.asm | 070-072 | 1 |
| Help.asm | 073-075 | 2 |

-continued

| File Name | Frame Nos. | Starts on Microfiche Sheet Number |
|---|---|---|
| Main.asm | 076–081 | 2 |
| Data.asm | 082–091* | 2 |
| Flags.asm | 092–116 | 2 |
| Spell.asm | 117–131 | 2 |
| Select.asm | 132–136 | 2 |
| PDict.asm | 137–156 | 2 |
| List.asm | 157–165 | 3 |
| Zcorrect.asm | 166–191 | 3 |
| Subs.asm | 192–194 | 3 |
| Numerics.asm | 195–210 | 3 |
| NumTable.asm | 211–214 | 4 |
| Correct.asm | 215–229 | 4 |
| CharSet.asm | 230–233 | 4 |
| Encode.asm | 234–266 | 4 |
| American GetTrie.asm | 267–319** | 4 |
| Index | 320 | 5 |

*Includes SpellEqu.asm file on frames 083–089
**Includes TrieEqu.asm file on frames 268–269

What is claimed is:

1. In a machine spelling dictionary having a memory containing a dictionary of words arranged in a tree format, a keyboard to input a query word composed of a set of characters, and encode means to encode each input character string from said tree and from said keyboard into coded strings for purposes of comparing query and tree coded strings, the encoding improvement comprising:
   a look up table to encode word segments from said tree having N or fewer characters into a corresponding coded string, and
   algorithm means for encoding word segments from said tree having more than N characters into a corresponding coded string,
   the word segments encoded by said look up table and by said algorithm means constituting the words in branch segments of the tree.

2. The improvement of claim 1 wherein $N=2$.

3. In a machine spelling dictionary having a memory containing a dictionary of words arranged in a tree format, a keyboard to input a query word composed of a set of characters, an encode means to encode each input characteristic string into a coded string, means for pruning the tree as a function of a similarity characteristic between the coded string of the query word and the coded string of a memory word from the tree, the pruning occurring when the similarity characteristic falls below a predetermined threshold, the improvement comprising:
   means responsive to the similarity characteristic at a node at a tree level N to provide an automatic termination function where said similarity characteristic is greater than a predetermined threshold,
   means responsive to said automatic termination function to omit the calculation of said similarity function at said tree level N for all branches that stem from the node at level N-1 that precedes said node at level N,
   whereby pruning is avoided for all branches so affected.

4. The improvement of claim 3 wherein N is greater than level 3.

5. The improvement of claim 4 wherein N is less than level 7.

6. The improvement of claim 3 further comprising:
   a look up table to encode word segments from said tree having M or fewer characters into a corresponding coded string, and
   algorithm means for encoding word segments from said tree having more than M characters into a corresponding coded string,
   the word segments encoded by said look up table and by said algorithm means constituting the word segments in a branch of the tree.

7. The improvement of claim 6 wherein $M=2$.

8. The improvement of claim 7 wherein N is greater than level 3.

9. The improvement of claim 8 wherein N is less than level 7.

* * * * *